(12) United States Patent
Baek et al.

(10) Patent No.: US 9,870,108 B2
(45) Date of Patent: Jan. 16, 2018

(54) DISPLAY DEVICE INCLUDING RELATIVELY MOVABLE DISPLAY PANEL AND TOUCH PANEL

(71) Applicant: SAMSUNG DISPLAY CO., LTD., Yongin-si, Gyeonggi-Do (KR)

(72) Inventors: Kyung Hyun Baek, Suwon-si (KR); Yoon Jee Shin, Ulsan (KR); Seung Rok Lee, Yongin-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 21 days.

(21) Appl. No.: 14/837,790

(22) Filed: Aug. 27, 2015

(65) Prior Publication Data

US 2016/0231837 A1    Aug. 11, 2016

(30) Foreign Application Priority Data

Feb. 5, 2015   (KR) .......................... 10-2015-0018152

(51) Int. Cl.
*G06F 3/044* (2006.01)
*G09G 3/3225* (2016.01)

(52) U.S. Cl.
CPC ........... *G06F 3/044* (2013.01); *G09G 3/3225* (2013.01); *G06F 2203/04102* (2013.01); *G06F 2203/04103* (2013.01); *G09G 2300/0426* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 2010/0177055 A1* | 7/2010 | Ookawara | G06F 3/047 345/173 |
| 2013/0049642 A1* | 2/2013 | Shen | G09G 3/3225 315/362 |
| 2014/0140036 A1* | 5/2014 | Kim | G06F 3/041 362/19 |
| 2014/0140037 A1* | 5/2014 | Cho | F21V 9/14 362/19 |
| 2014/0293581 A1* | 10/2014 | Bae | G02F 1/13338 362/97.1 |
| 2014/0320762 A1* | 10/2014 | Jeong | G06F 3/041 349/12 |
| 2014/0374704 A1* | 12/2014 | Jang | H01L 51/0097 257/40 |

FOREIGN PATENT DOCUMENTS

| | | |
|---|---|---|
| KR | 10-2006-0070873 A | 6/2006 |
| KR | 10-2010-0083246 A | 7/2010 |
| KR | 10-2014-0046366 A | 4/2014 |
| KR | 10-2014-0055529 A | 5/2014 |

* cited by examiner

*Primary Examiner* — David D Davis
(74) *Attorney, Agent, or Firm* — Lee & Morse, P.C.

(57) ABSTRACT

A display device that includes a display panel to display an image; a touch panel on the display panel; a spacer layer between the display panel and the touch panel; and a window attached onto the touch panel, wherein the display panel and the touch panel are relatively movable.

10 Claims, 6 Drawing Sheets

DISPLAY DEVICE INCLUDING RELATIVELY MOVABLE DISPLAY PANEL AND TOUCH PANEL

CROSS-REFERENCE TO RELATED APPLICATION

Korean Patent Application No. 10-2015-0018152, filed on Feb. 5, 2015, in the Korean Intellectual Property Office, and entitled: "Display Device," is incorporated by reference herein in its entirety.

BACKGROUND

1. Field

Embodiments relate to a display device.

2. Description of the Related Art

Recently, a flexible display device, in which the display device itself is bendable, foldable, or rollable, has been actively developed. The flexible display device can be folded or rolled in a roller form to maximize a portable property and be used to various fields.

The flexible display device may include a display element formed on a flexible substrate, and display elements that may be used in the flexible display device may include an organic light emitting diode display element, a liquid crystal display element, an electrophoretic display (EPD) element, or the like.

The display elements may commonly include thin film transistors. Accordingly, in order to form the flexible display device, the flexible substrate may be subjected to several thin film processes.

In addition, the flexible substrate may be sealed by an encapsulation layer through the thin film processes. The flexible substrate, the thin film transistor formed on the flexible substrate, and the encapsulation layer may configure a display panel of the flexible display device.

The above information disclosed in this Background section is only for enhancement of understanding of the background of the described technology and therefore it may contain information that does not form the prior art that is already known in this country to a person of ordinary skill in the art.

SUMMARY

Embodiments are directed to a display device.

The embodiments may be realized by providing a display device including a display panel to display an image; a touch panel on the display panel; a spacer layer between the display panel and the touch panel; and a window attached onto the touch panel, wherein the display panel and the touch panel are relatively movable.

The spacer layer may include a base member attached onto a surface of the display panel; and at least one spacer member protruding from the base member and supporting the touch panel at an end of the at least one spacer member.

The spacer layer may include a plurality of the spacer members spaced apart from each other at predetermined intervals.

The spacer members of the plurality of spacer members may be arranged in a lattice form.

The spacer layer may further include an adhesive layer between the at least one spacer member and the touch panel to adhere the at least one spacer member to the touch panel.

The base member may include a guide protrusion protruding toward the touch panel, and the touch panel may include a guide groove corresponding to the guide protrusion.

The base member, the spacer member, and the guide protrusion may be formed of a same material.

The guide protrusion may extend in a lengthwise direction along both ends of the base member.

The display device may be foldable about an axis that is parallel to one side of the display device, and the guide protrusion may extend in a direction that is orthogonal to the axis.

The spacer layer may be formed of a flexible material.

The spacer layer may be formed of a transparent material.

The display device may further include a polarizing plate on the display panel, the touch panel being between the polarizing plate and the display panel.

The display device may further include a first adhesive film between the touch panel and the polarizing plate to couple the touch panel and the polarizing plate with each other; and a second adhesive film between the polarizing plate and the window to couple the polarizing plate and the window with each other.

The display panel may include an organic light emitting element.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element such as a layer, film, region, or substrate is referred to as being "on" another element, it can be directly on the other element or intervening elements may also be present.

In addition, in the specification, unless explicitly described to the contrary, the word "comprise" and variations such as "comprises," "includes," "comprising", or the like, will be understood to imply the inclusion of stated elements but not the exclusion of any other elements. Further, in the specification, the word "on" means positioning on or below the object portion, but does not essentially mean positioning on the upper side of the object portion based on a gravity direction.

Figure 1:
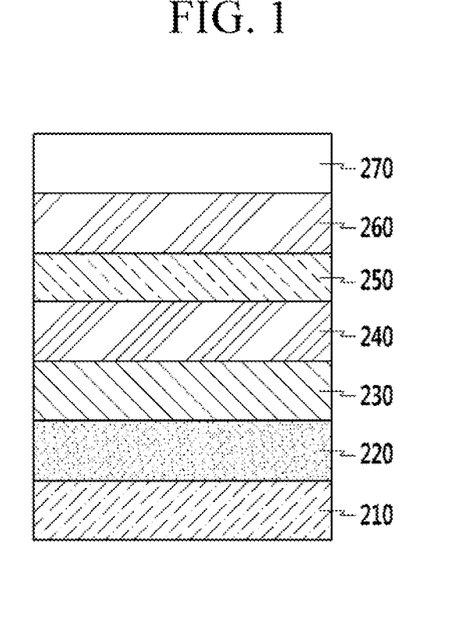
FIG. 1 illustrates a cross-sectional view of a display device according to an exemplary embodiment.

FIG. 1 illustrates a cross-sectional view of a display device according to an exemplary embodiment.

Referring to FIG. 1, the display device according to the exemplary embodiment may include a display panel 210, a spacer layer 220, a touch panel 230, and a window 270, as a display device in which, when the display device is folded, a gap between the display panel 210 and the touch panel 230 may be uniformly maintained and stress between the panels may be reduced.

According to the exemplary embodiment, the display panel 210 may be a constituent element displaying an image.

First, the display panel 210 configuring the display device according to the exemplary embodiment will be described with reference to FIGS. 2 and 3. Hereinafter, the display panel may correspond to the display panel 210 of FIG. 1.

The display device described with reference to FIGS. 2 and 3 relates to an organic light emitting diode device (OLED).

In an implementation, a liquid crystal display (LCD), a plasma display panel (PDP), a field effect display (FED), an electrophoretic display device, or the like may be applied as the display device.

Figure 2:
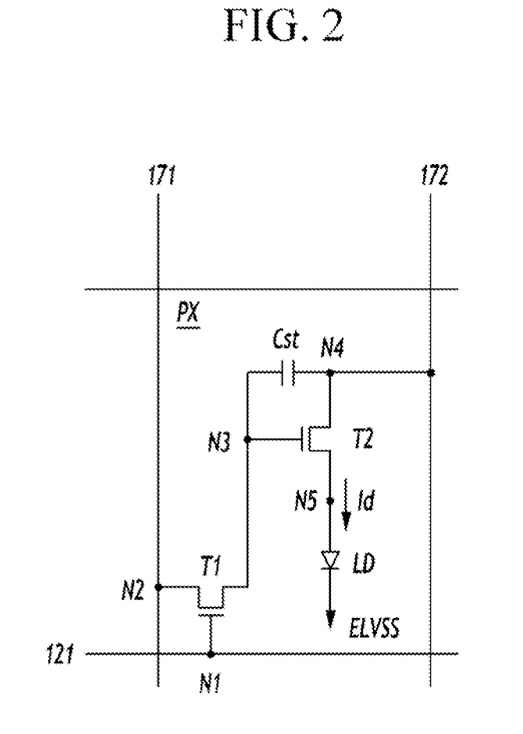
FIG. 2 illustrates an equivalent circuit diagram of one pixel of a display panel illustrated in FIG. 1.

FIG. 2 illustrates an equivalent circuit diagram of one pixel of a display panel illustrated in FIG. 1. FIG. 3 illustrates a cross-sectional view of the display panel of FIG. 1.

Referring to FIG. 2, the OLED may include a plurality of signal lines 121, 171, and 172, and a pixel PX connected thereto. The pixel PX may be one of a red pixel R, a green pixel G, and a blue pixel B.

The signal lines include a scanning signal line 121 transferring a gate signal (or a scanning signal), a data line 171 transferring a data signal, a driving voltage line 172 transferring a driving voltage, and the like. The scanning signal lines 121 may extend substantially in a row direction and may be substantially parallel to each other, and the data lines 171 may extend substantially in a column direction and may be substantially parallel to each other. The driving voltage lines 172 may extend substantially in a column direction, but may extend in a row direction or a column direction or be formed in a net shape.

In this case, one pixel PX may include a thin film transistor including a switching transistor T1 and a driving transistor T2, a storage capacitor Cst, and an organic light emitting element LD. In an implementation, one pixel PX may further include a thin film transistor and a capacitor so as to compensate for a current provided in the organic light emitting element.

The switching transistor T1 may have a control terminal N1, an input terminal N2, and an output terminal N3, and the control terminal N1 may be connected to the scanning signal line 121, the input terminal N2 may be connected to the data line 171, and the output terminal N3 may be connected to the driving transistor T2. The switching transistor T1 transfers the data signal received from the data line 171 to the driving transistor T2 in response to the scanning signal received from the scanning signal line 121.

In addition, the driving transistor T2 may also have a control terminal N3, an input terminal N4, and an output terminal N5, and the control terminal N3 may be connected to the switching transistor T1, the input terminal N4 may be connected to the driving voltage line 172, and the output terminal N5 may be connected to the organic light emitting element LD. The driving transistor T2 may run an output current Id of which the amplitude varies according to a voltage applied between the control terminal N3 and the output terminal N5.

In this case, the capacitor Cst may be connected between the control terminal N3 and the input terminal N4 of the driving transistor T2. The capacitor Cst charges a data signal applied to the control terminal N3 of the driving transistor T2 and maintains the charged data signal even after the switching transistor T1 is turned off.

The organic light emitting element LD, e.g., as an organic light emitting diode (OLED), may have an anode connected to the output terminal N5 of the driving transistor T2 and a cathode connected to a common voltage Vss. The organic light emitting element LD may emit light by varying intensities according to the output current Id of the driving transistor T2 to display an image.

The organic light emitting element LD may include an organic material that uniquely emits light of any one or one or more of the primary colors such as three primary colors of red, green, and blue, and the organic light emitting diode device may display a desired image by a spatial sum of the colors.

The switching transistor T1 and the driving transistor T2 may be n-channel field effect transistors (FET), or at least one thereof may be a p-channel field effect transistor. Further, a connection relationship of the transistors T1 and T2, the capacitor Cst, and the organic light emitting element LD may be changed.

Hereinafter, the organic light emitting diode device will be described with reference to a cross-sectional view illustrated in FIG. 3.

Figure 3:
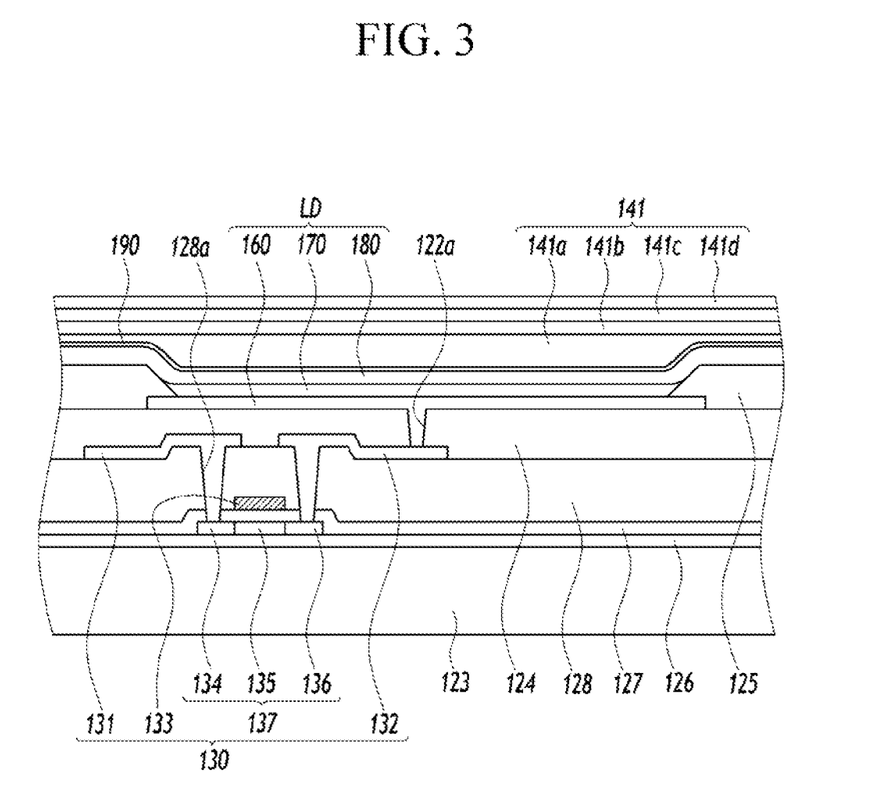
FIG. 3 illustrates a cross-sectional view of the display panel of FIG. 1.

Referring to FIG. 3, a substrate 123 may be formed as an insulation substrate made of glass, quartz, ceramic, plastic and the like. In an implementation, the substrate 123 may be formed as a metallic substrate made of stainless steel or the like.

In addition, a substrate buffer layer 126 may be formed on the substrate 123. The substrate buffer layer 126 may help prevent penetration of impurity elements and planarize the surface.

In this case, the substrate buffer layer 126 may be made of various materials capable of performing the functions. For example, any one of a silicon nitride ($SiN_x$) film, a silicon oxide ($SiO_2$) film and a silicon oxynitride ($SiO_xN_y$) film may be used in the substrate buffer layer 126. In an implementation, the substrate buffer layer 126 may be omitted according to a kind of substrate 123 and a process condition.

A driving semiconductor layer 137 may be formed on the substrate buffer layer 126. The driving semiconductor layer 137 may be formed as a polysilicon layer. Further, the driving semiconductor layer 137 may include a channel region 135 in which impurities are not doped, and a source region 134 and a drain region 136 formed at both sides of the channel region 135, in which impurities are doped. In this case, the doped ion materials may include P-type impurities such as boron (B), e.g., $B_2H_6$ may be used. Here, the impurities vary according to a kind of thin film transistor.

A gate insulating layer 127 made of silicon nitride (SiNx) or silicon oxide ($SiO_2$) may be formed on the driving semiconductor layer 137. A gate line including a driving gate electrode 133 may be formed on the gate insulating layer 127. In addition, the driving gate electrode 133 may be formed to overlap with at least a part of the driving semiconductor layer 137, e.g., the channel region 135.

Meanwhile, an interlayer insulating layer 128 covering the driving gate electrode 133 may be formed on the gate insulating layer 127. In the gate insulating layer 127 and the interlayer insulating layer 128, a contact hole 128a exposing the source region 134 and the drain region 136 of the driving semiconductor layer 137 may be formed. The interlayer insulating layer 128 may be formed by using a ceramic-based material including silicon nitride (SiNx) and silicon oxide ($SiO_2$), like the gate insulating layer 127.

In addition, a data line including the driving source electrode 131 and the driving drain electrode 132 may be formed on the interlayer insulating layer 128. Further, the driving source electrode 131 and the driving drain electrode 132 may be connected with the source region 134 and the drain region 136 of the driving semiconductor layer 137 through the contact hole 128a formed in the interlayer insulating layer 128 and the gate insulating layer 127, respectively.

As such, the driving thin film transistor 130 including the driving semiconductor layer 137, the driving gate electrode 133, the driving source electrode 131, and the driving drain electrode 132 may be formed. In an implementation, the configuration of the driving thin film transistor 130 may be variously changed into another suitable configuration.

In addition, a planarization layer 124 covering the data line may be formed on the interlayer insulating layer 128. The planarization layer 124 may remove and planarize a step in order to increase the light emitting efficiency of the organic light emitting element to be formed thereon. In addition, the planarization layer 124 may have an electrode via hole 122a exposing a part of the drain electrode 132.

The planarization layer 124 may be made of one or more materials of, e.g., polyacrylate resin, epoxy resin, phenolic resin, polyamide resin, polyimide resin, unsaturated polyester resin, poly-phenylenether resin, poly-phenylenesulfide resin, or benzocyclobutene (BCB).

In an implementation, one of the planarization layer 124 and the interlayer insulating layer 128 may be omitted.

In this case, a first electrode of the organic light emitting element, e.g., a pixel electrode 160 may be formed on the planarization layer 124. For example, the organic light emitting diode device may include a plurality of pixel electrodes 160 which is disposed for every plurality of pixels, respectively. In this case, the plurality of pixel electrodes 160 may be spaced apart from each other. The pixel electrode 160 may be connected with the drain electrode 132 through the electrode via hole 122a of the planarization layer 124.

In addition, a pixel defining layer 125 having an opening exposing the pixel electrode 160 may be formed on the planarization layer 124. For example, the pixel defining layer 125 may have a plurality of openings formed for each pixel. In this case, an organic emission layer 170 may be formed for each opening formed by the pixel defining layer 125. Accordingly, a pixel area in which each organic emission layer is formed by the pixel defining layer 125 may be defined.

In this case, the pixel electrode 160 may be disposed to correspond to the opening of the pixel defining layer 125. In an implementation, the pixel electrode 160 is not necessarily disposed only in the opening of the pixel defining layer 125, and a part of the pixel electrode 160 may be disposed below the pixel defining layer 125 so as to overlap with the pixel defining layer 125.

The pixel defining layer 125 may be made of resin such as polyacrylate resin and polyimide, or a silica-based inorganic material.

Meanwhile, the organic emission layer 170 may be formed on the pixel electrode 160.

In addition, a second electrode, e.g., a common electrode 180, may be formed on the organic emission layer 170. As such, the organic light emitting element LD may be formed, which includes the pixel electrode 160, the organic emission layer 170, and the common electrode 180.

In this case, the pixel electrode 160 and the common electrode 180 each may be made of a transparent conductive material or made of a semi-transmissive or reflective conductive material. According to a kind of material forming the pixel electrode 160 and the common electrode 180, the organic light emitting diode device may be a top emission type, a bottom emission type, or a double-sided emission type.

Meanwhile, an overcoat 190 (covering and protecting the common electrode 180) may be formed as an organic layer on the common electrode 180.

In addition, a thin film encapsulation layer 141 may be formed on the overcoat 190. The thin film encapsulation layer 141 may seal and protect the organic light emitting element LD and a driving circuit unit formed on the substrate 123 from the outside.

As will be described in greater detail below, in the display device according to the exemplary embodiment, the display panel 210 and the touch panel 230 may be attached to each other through the spacer layer 220, and as a result, when the display device is bent or folded, the thin film encapsulation layer 141 may be prevented from being released by stress due to adhesion between the display panel 210 and the touch panel 230.

Figure 6:
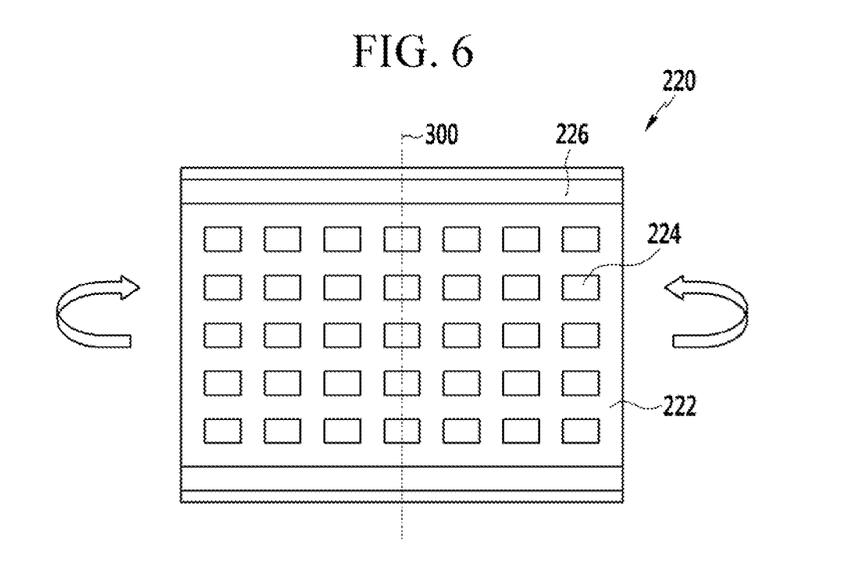
FIG. 6 illustrates a plan view of the spacer layer in the display device according to the exemplary embodiment.

The thin film encapsulation layer 141 may include encapsulation organic layers 141a and 141c and encapsulation inorganic layers 173 and 121d which are alternately laminated one by one. In an implementation, as illustrated in FIG. 6, two encapsulation organic layers 141a and 141c and two encapsulation inorganic layers 141b and 141d may be alternately laminated one by one to configure the thin film encapsulation layer 141.

In an implementation, referring to FIG. 1, a polarizing plate 250 may be disposed on the touch panel 230. In an implementation, as shown in FIG. 1, the polarizing plate 250 may be disposed on the touch panel 230. In an implementation, the polarizing plate 250 may be disposed between the display panel 210 and the touch panel 230 according to a display device. However, hereinafter, a case where the polarizing plate 250 is disposed on the touch panel 230 will be described as an example.

The polarizing plate 250 converts an optical axial of light emitted to the outside through the display panel 210. In an implementation, the polarizing plate has a structure in which transparent protective films are laminated on both sides or one side of the polarizer made of polyvinyl alcohol-based resin.

For example, the polarizing plate 250 may be formed as a structure in which a triacetyl cellulose (TAC) film as a protective film is adhered to a polarizer having a structure in which polyvinyl alcohol (hereinafter, referred to as PVA)-based molecular chains are aligned in a predetermined direction and an iodine-based compound or a dichroic polarizing material is included. In this case, the polarizer and the protective film may be generally adhered to each other by a water-based adhesive made of a polyvinyl alcohol solution.

In an implementation, polarizing plates having various suitable structures may be used.

According to the exemplary embodiment, the touch panel 230 may be spaced apart from the display panel 210 on the display panel 210 to sense an external touch input. In this case, as the touch panel 230, a capacitive type touch panel may be applied. In an implementation, the touch panel 230 may be a resistive type or an electromagnetic type.

Meanwhile, the window 270 may be disposed on the touch panel 230. The window 270 may protect the touch panel 230 that is positioned below the window 270 and on the display panel 210.

Meanwhile, according to the exemplary embodiment, a first adhesive film 240 may be disposed between the touch panel 230 and the polarizing plate 250.

In an implementation, a second adhesive film 260 may be disposed between the polarizing plate 250 and the window 270.

The first adhesive film 240 (between the touch panel 230 and the polarizing plate 250) may assemble, adhere, or couple the touch panel 230 with the polarizing plate 250.

The second adhesive film 260 positioned between the polarizing plate 250 and the window 270 may assemble, adhere, or couple the polarizing plate 250 with the window 270.

In an implementation, the adhesive films 240 and 260 may each independently be made of or include, e.g., one or more of 2-ethylhexyl acrylate (2-EHA), n-butyl acrylate (n-BA), methyl methacrylate (MMA), and acrylic acid (AAc). For example, the adhesive films 240 and 260 may be formed by mixing an acryl-based component.

According to the exemplary embodiment, a spacer layer 220 may be formed or provided between the display panel 210 and the touch panel 230.

The spacer layer 220, as a component that couples the display panel 210 and the touch panel 230 with each other, may help reduce stress generated by adhesion between the display panel 210 and the touch panel 230 when the display device is folded or bent while uniformly maintaining a gap between the display panel 210 and the touch panel 230.

To this end, according to the exemplary embodiment, the display panel 210 and the touch panel 230 may be relatively movable, and hereinafter, the configuration of the spacer layer 220 will be described in detail.

Figure 4:
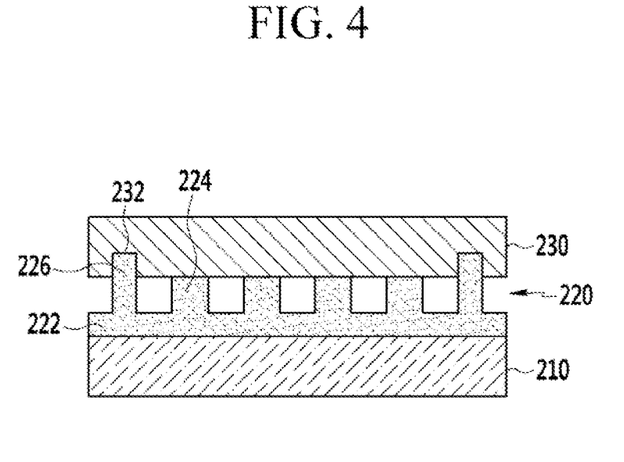
FIG. 4 illustrates a detailed cross-sectional view of a spacer layer in the display device according to the exemplary embodiment.

FIG. 4 illustrates a detailed cross-sectional view illustrating a spacer layer in the display device according to the exemplary embodiment.

Referring to FIG. 4, the spacer layer 220 may be disposed between the display panel 210 and the touch panel 230. The spacer layer 220 may include a base member 222, a spacer member 224, and a guide protrusion 226.

The base member 222 may be attached onto an upper surface of the display panel 210 (e.g., a surface of the display panel 210 that faces the touch panel 230). In an implementation, the base member 222 may be made of or may include, e.g., an organic material.

For example, the base member 222 may be formed by coating an organic material on the upper surface of the display panel 210 in a thin film form.

In an implementation, the organic material forming the base member 222 may be or include a compound formed by reacting with monomers or polymer, e.g., may be formed of a transparent and flexible plastic film.

In an implementation, the base member 222 may be formed by various suitable materials and methods.

The spacer member 224, e.g., as a member that uniformly maintains a gap between the display panel 210 and the touch panel 230, may protrude on or from the base member 222.

For example, referring to FIG. 4, an end of the spacer member 224 that protrudes toward the touch panel 230 may support the touch panel 230.

In an implementation, a plurality of spacer members 224 may be formed, and may be arranged to be spaced apart from each other at predetermined intervals.

In an implementation, the spacer member 224 may be made of a same material as the base member 222 and may be integrally formed with the base member 222.

The spacer layer 220 may adhere the display panel 210 and the touch panel 230 to each other. Thus, the end of the spacer member 224 supporting the touch panel 230 may be attached to the touch panel 230.

For example, the end of the spacer member 224 may be attached onto a lower surface (e.g., display panel-facing surface) of the touch panel 230 by a housing of the display device that may compress the display panel 210 and the touch panel 230 to each other without a separate fastener or adherer.

For example, the end of the spacer member 224 may be firmly attached onto the lower surface of the touch panel 230 by a thermo-compression method.

In an implementation the spacer member 224 and the touch panel 230 may be adhered to each other through a separate fastener or adherer.

Figure 5:
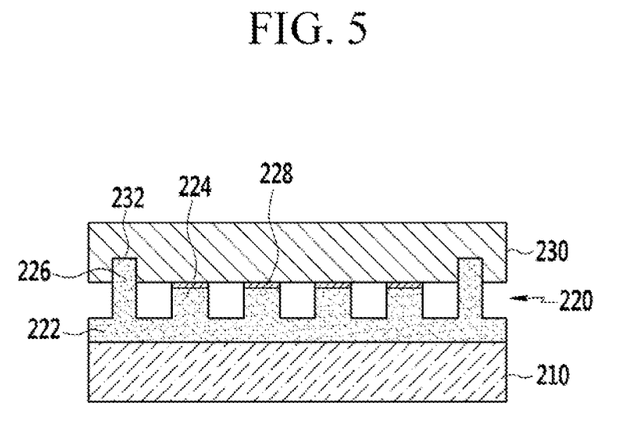
FIG. 5 illustrates a detailed cross-sectional view of another form of the spacer layer in the display device according to the exemplary embodiment.

FIG. 5 illustrates a detailed cross-sectional view of another form of the spacer layer in the display device according to the exemplary embodiment.

Referring to FIG. 5, the spacer layer 220 may include an adhesive layer 228.

The adhesive layer 228, as a layer for adhering the end of the spacer member 224 to the touch panel 230, may be disposed between the spacer member 224 and the touch panel 230.

For example, as illustrated in FIG. 5, the adhesive layer 228 may be formed with the same area as a cross-sectional area of the spacer member 224.

As a result, the spacer layer 220 may adhere the display panel 210 and the touch panel 230 to each other.

The spacer layer 220 may uniformly maintain the gap between the display panel 210 and the touch panel 230 at all times by the aforementioned spacer member 224, even if the display device is folded.

FIG. 6 illustrates a plan view of the spacer layer in the display device according to the exemplary embodiment.

Referring to FIG. 6, in an implementation, a plurality of spacer members 224 may be arranged on the base member 222 in a lattice form.

For example, the plurality of spacer members 224 may be arranged at regular intervals to uniformly maintain the gap between the display panel 210 and the touch panel 230 at all of the positions of the spacer layer 220.

For example, in the case of the flexible display device, as illustrated in FIG. 3, even when the display device is folded about an axis 300 that is parallel to one side of the display device, the gap between the display panel 210 and the touch panel 230 may be uniformly maintained at all of the positions of the spacer layer 220.

As such, in the display device according to the exemplary embodiment, the display panel 210 and the touch panel 230 may be adhered to each other by the end of the spacer member 224, e.g., adhering positions may be uniformly distributed as the entire adhering area is decreased, and, in the case where the display device is folded, as compared with the case where the entire areas of the display panel 210 and the touch panel 230 are adhered to each other, stress by the adhesion between the two panels may be reduced.

Further, according to the exemplary embodiment, when the display device is folded, the display panel 210 and the touch panel 230 may be relatively movable, thereby minimizing stress that may otherwise occur due to adhesion (e.g., direct adhesion) between the two panels.

In an implementation, the spacer layer 220 may include a guide protrusion 226.

For example, the guide protrusion 226 may be configured so that the display panel 210 and the touch panel 230 are relatively movable.

Referring FIGS. 4 to 6, the guide protrusion 226 may protrude toward the touch panel 230 on or from the base member 222.

According to the exemplary embodiment, the guide protrusion 226 may be formed of the same material as the base member 222 and/or may be integrally formed with the base member 222.

As illustrated in FIGS. 4 and 5, a guide groove 232 corresponding to or complementary to the guide protrusion 226 may be formed on or in the touch panel 230.

The guide groove 232 may have a shape, number, and/or layout corresponding to the guide protrusion 226, and may be formed on or in the lower surface of the touch panel 230.

Referring to FIGS. 4 and 6, the guide protrusion 226 may be elongated at ends, e.g., both ends, of the base member 222.

For example, the guide protrusion 226 and the guide groove 232 may be arranged or may extend in a vertical direction to the central axis 300 where the display device is folded. For example, the guide protrusion 226 and the guide groove 232 may extend in a lengthwise direction that crosses or is substantially orthogonal to the central axis 300.

For example, as illustrated in FIG. 6, in the case where the display device is foldable about the central axis 300 that is parallel to a short side of the display device, the guide protrusion 226 and the guide groove 232 may be arranged to be or extend in parallel with a long side of the display device.

In an implementation, two guide protrusions 226 may be disposed at outer portions or edges of two long sides of the display device, respectively.

In this case, there may be an advantage that the guide protrusion 226 may be disposed to avoid, e.g., so as to not interfere with, the display area of the display device.

Figure 7:
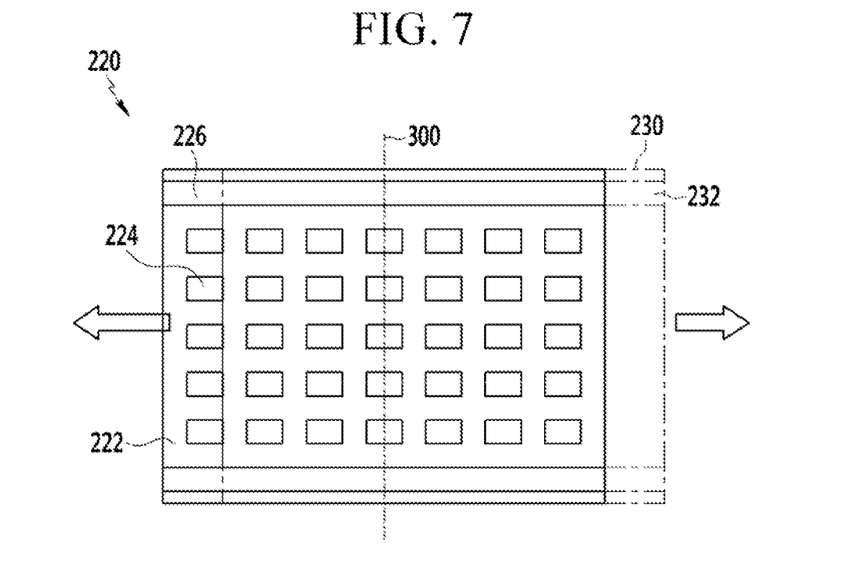
FIG. 7 illustrates a plan view of a state where a display panel and a touch panel relatively move in the display device according to the exemplary embodiment.

FIG. 7 illustrates a plan view of a state where a display panel and a touch panel relatively move in the display device according to the exemplary embodiment.

Referring to FIG. 7, when the display device is folded about the axis 300 (parallel to the short side of the display device), the display panel side (where the guide protrusion 226 parallel to the long side of the display device is formed) of the display device and the touch panel side (where the guide groove 232 corresponding to the guide protrusion 226 is formed) of the display device may be relatively movable.

For example, the guide protrusion 226 may move along the guide groove 232, when the display device is folded about the axis 300 vertical to the guide protrusion 226, and the display panel 210 and the touch panel 230 may relatively move.

As a result, adhesion between the display panel 210 and the touch panel 230, e.g., stress due to the adhesive layer 228 (see FIG. 5) of the spacer layer 220 may be reduced.

For convenience of understanding, the function of the display device will be further described below.

Figure 8:
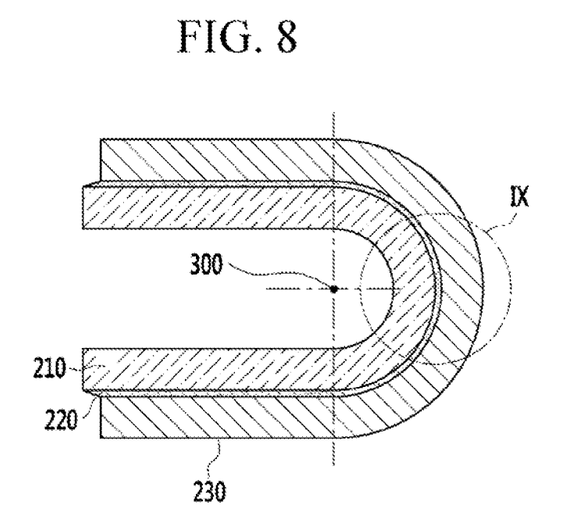
FIG. 8 illustrates a cross-sectional view of a state where the display device according to the exemplary embodiment is folded.
Figure 9:
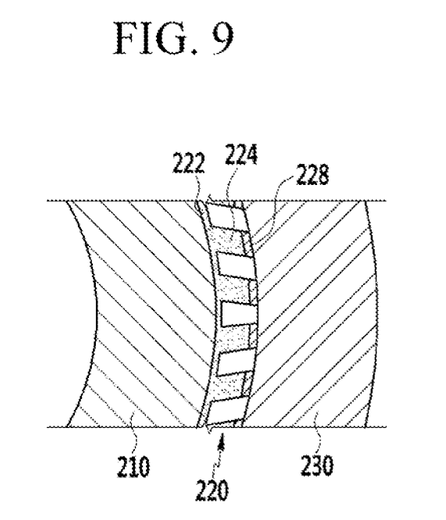
FIG. 9 illustrates an enlarged diagram of part IX of FIG. 8.

FIG. 8 illustrates a cross-sectional view of a state where the display device according to the exemplary embodiment is folded. FIG. 9 illustrates an enlarged diagram of part IX of FIG. 8.

Referring to FIG. 8, when the display device is folded about the axis 300 (that is parallel with one side of the display device), the display panel 210 and the touch panel 230 may have different lengths due to a difference in curvature radii thereof.

In this case, stress (due to adhesion between the display panel 210 and the touch panel 230) could be generated. In the case of adhering the display panel 210 and the touch panel 230 by using a general adhesive film such as a pressure sensitive adhesive (PSA), the adhesive film could be detached, or thin films laminated on the panel could be released.

For example, in the case of the organic light emitting diode device, detachment of the thin film encapsulation layer 141 (see FIG. 3) of the display panel 210 could occur.

In the display device according to the exemplary embodiment, the display panel 210 and the touch panel 230 may be adhered with the plurality of spacer members 224 arranged in a lattice structure through an adhesive layer 228 at the end, and the display panel 210 and the touch panel 230 may be relatively moved by providing the guide protrusion 226 and the guide groove 232, thereby efficiently preventing the undesirable detachment and/or release.

Referring to FIGS. 7 and 8, even though the display panel 210 and the touch panel 230 may have difference lengths due to a difference in the curvature radii, the display panel 210 and the touch panel 230 may be relatively movable to help reduce stress that may be caused due to the adhesion between the two panels.

Further, referring to FIGS. 8 and 9, entire surfaces of the display panel 210 and the touch panel 230 may not be adhered to each other, but rather only ends of the plurality of spaced apart spacer members 224 may be adhered to the touch panel 230, thereby dispersing stress caused by the adhesion.

Further, as illustrated in FIG. 9, the spacer layer 220 between the display panel 210 and the touch panel 230 may be formed of a flexible material, and as a result, even though the display panel 210 and the touch panel 230 are relatively movable, an adhesive state between two panels may be maintained.

In an implementation, the gap between the display panel 210 and the touch panel 230 may be always uniformly maintained by the spacer members 224 arranged uniformly with the same thickness.

In an implementation, as illustrated in FIG. 8, the display device may be folded toward the inner side of the display panel 210 and the outer side of the touch panel 230. In an implementation, the display device may be folded toward the outer side of the display panel 210 and the inner side of the touch panel 230.

As such, the display device according to the exemplary embodiment may include the spacer layer 220 between the display panel 210 and the touch panel 230, thereby reducing stress applied between the display panel and the touch panel.

In this case, the spacer layer 220 may support the display panel 210 and the touch panel 230 by using the plurality of spacer members 224 uniformly arranged to be spaced apart from each other at predetermined intervals, thereby uniformly maintaining the gap between the two panels at all times.

Further, two panels may be adhered to each other by using the ends of the spacer members 224, thereby reducing stress due to adhesion between two panels.

Further, the two panels may be relatively movable by the guide protrusion 226 and the guide groove 232 corresponding to the guide protrusion 226. As a result, when the display device is folded, the stress due to adhesion between two panels may be minimized.

For example, the relative movability of the display panel 210 and the touch panel 230 may refer to the independent movability of the panels relative to one another. For example, as described above, the panels may be folded to each independently have a different radius of curvature, due to the presence of the spacer layer therebetween. For example, the panels may be independently movable relative to one another to a particular degree, while still being adhered to one another by the spacer layer therebetween. For example, the spacer layer may adhere or couple the panels together, and may limit the degree of relative motion of the panels relative to one another within a desired amount.

By way of summation and review, in addition to a display panel, a plurality of components (e.g., a touch panel used as an input apparatus and a polarizing plate converting an optical axis of light) may be laminated to form a display device. In this case, generally, in order to attach the plurality of components, adhesive films may be used between the components.

However, in the flexible display device, when the display device itself is bent, rolled, or folded, the adhesive film may be detached due to stress. For example, due to stress of the adhesive film between the display panel and the touch panel, the encapsulation layer of the display panel may be detached or released.

The embodiments may provide a display device having advantages of reducing stress applied between a display panel and a touch panel.

According to the exemplary embodiment, a spacer layer may be included between the display panel and the touch panel to reduce stress applied between the display panel and the touch panel.

Further, while a gap between the display panel and the touch panel may be uniformly maintained, the two panels may relatively move.

The embodiments may provide a flexible display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

| <Description of symbols> | |
|---|---|
| 210 Display panel | 220 Spacer layer |
| 222 Base member | 224 Spacer member |
| 226 Guide protrusion | 228 Adhesive layer |
| 230 Touch panel | 232 Guide groove |
| 240 First adhesive film | 250 Polarizing plate |
| 260 Second adhesive film | 270 Window |

What is claimed is:

1. A flexible display device, comprising:
a display panel to display an image;
a touch panel on the display panel;
a spacer layer between the display panel and the touch panel; and
a window attached onto the touch panel,
wherein the display panel and the touch panel are relatively movable,
wherein the spacer layer includes:
a base member attached onto a surface of the display panel; and
at least one spacer member protruding from the base member and supporting the touch panel at an end of the at least one spacer member,
wherein the base member includes a guide protrusion protruding toward the touch panel,
wherein the touch panel includes a guide groove corresponding to the guide protrusion,
wherein the guide protrusion extends in a lengthwise direction along both ends of the base member,
wherein the display device is foldable about an axis that is parallel to one side of the display device, and
wherein the guide protrusion extends in a direction that is orthogonal to the axis.

2. The display device as claimed in claim 1, wherein the spacer layer includes a plurality of the spacer members spaced apart from each other at predetermined intervals.

3. The display device as claimed in claim 2, wherein the spacer members of the plurality of spacer members are arranged in a lattice.

4. The display device as claimed in claim 1, wherein the spacer layer further includes an adhesive layer between the at least one spacer member and the touch panel to adhere the at least one spacer member to the touch panel.

5. The display device as claimed in claim 1, wherein the base member, the spacer member, and the guide protrusion are formed of a same material.

6. The display device as claimed in claim 1, wherein the spacer layer is formed of a flexible material.

7. The display device as claimed in claim 1, wherein the spacer layer is formed of a transparent material.

8. The display device as claimed in claim 1, further comprising a polarizing plate on the display panel, the touch panel being between the polarizing plate and the display panel.

9. The display device as claimed in claim 8, further comprising:
a first adhesive film between the touch panel and the polarizing plate to couple the touch panel and the polarizing plate with each other; and
a second adhesive film between the polarizing plate and the window to couple the polarizing plate and the window with each other.

10. The display device as claimed in claim 1, wherein the display panel includes an organic light emitting element.

* * * * *